United States Patent Office 3,336,356
Patented Aug. 15, 1967

3,336,356
ETHER-LINKED ACIDS, ESTERS, AND AMIDES
OF TRIARYLACRYLONITRILES
Robert Edward Allen, Walnut Creek, and Laszlo Ambrus, Berkeley, Calif., assignors to Cutter Laboratories Inc., Berkeley, Calif., a corporation of Delaware
No Drawing. Filed July 2, 1964, Ser. No. 380,084
16 Claims. (Cl. 260—465)

The present invention relates to derivatives of triarylacrylonitriles and is more particularly concerned with ether-linked acids, esters and amides of triarylacrylonitriles, a method for their preparation, compositions incorporating the novel compounds, and a method of treatment utilizing the active compounds of the invention and compositions containing the same.

The novel compounds of the present invention may be represented by the formula:

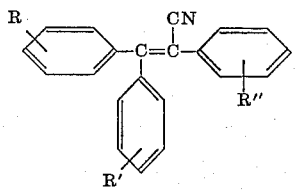

I wherein R is selected from the group consisting of hydrogen, lower-alkyl, lower-alkoxy, halogen, trifluoromethyl, and dilower-alkylamino, and
wherein R' and R" are independently selected from the group consisting of hydrogen, lower-alkyl, lower-alkoxy, halogen, trifluoromethyl, dilower-alkylamino, hydroxy, and

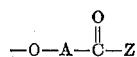

(hereinafter written —O—A—COZ), in which A is lower-alkylene and Z is selected from the group consisting of hydroxy, —OM wherein M is an alkali or alkaline earth metal, lower-alkoxy, and —NR$^1$R$^2$, in which R$^1$ and R$^2$ are independently selected from the group consisting of hydrogen, lower-alkyl, phenyl, and benzyl and, together with the nitrogen atom, pyrrolidino, piperidino, morpholino, piperazino, N-loweralkylpiperazino and mono and poly C-lower-alkyl derivatives thereof,
at least one of R' and R" being —O—A—COZ.

The preferred compounds are those in which only one of R' and R" is —O—A—COZ, and wherein A has a maximum of three carbon atoms. In this group, those compounds in which R and the other of R' and R" are hydrogen or a para-substituent are preferred. The compounds of the invention exist as cis or trans geometric isomers, and such isomers are within the scope of the invention as well as the isomeric mixtures. Some of the compounds also exist as optical isomers, e.g., the compounds of Examples 7 and 9, and such optical isomers and racemic mixtures thereof are also within the purview of the invention.

The compounds of the foregoing formula are characterized by gonadotrophic inhibitory and uterotrophic activity, and are accordingly useful in the treatment of conditions involving fertility and sterility problems in both males or females, especially those conditions arising from or subject to influence by female or male hormonal imbalance. The compounds are also useful as herbicides and insecticides.

Throughout the specification and claims the terms lower-alkyl, lower-alkoxy, and dilower-alkylamino refer to the respective groups having up to eight carbon atoms, preferably a maximum of four carbon atoms, inclusive, in each lower-alkyl group thereof. A "lower-alkylene" group, as used herein, contains a maximum of eight carbon atoms, preferably a maximum of four carbon atoms, and is of straight or branched structure.

The compounds of the present invention are prepared by reacting a phenolic hydroxy-containing acrylonitrile, preferably in the form of a salt thereof, with an appropriately substituted halide X—A—COZ, as hereinafter further defined, to form a compound of Formula I.

The hydroxy-containing triarylacrylonitrile starting material has the following formula:

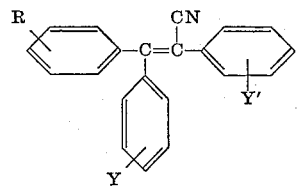

II wherein R is selected from the group consisting of hydrogen, lower-alkyl, lower-alkoxy, halogen, trifluoromethyl, and dilower-alkylamino, and
wherein Y and Y' are independently selected from the group consisting of hydrogen, lower-alkyl, lower-alkoxy, halogen, trifluoromethyl, dilower-alkylamino, and hydroxy, at least one of Y and Y' being hydroxy.

The hydroxy-containing triarylacrylonitrile starting materials may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic intermediate where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethylformamide, or any combination of these, preferably at their reflux temperatures, using a basic catalyst such as sodium or potassium or lithium amide, hydride, or the metals themselves in a finely divided state in a solvent such as toluene or xylene.

The compounds of Formula II are preferably reacted, in the form of an alkali or alkaline earth metal salt thereof, with an appropriately substituted halide having the formula X—A—COZ, wherein X is halogen, A is lower-alkylene, and wherein Z is OM wherein M is an alkali or alkaline earth metal, lower-alkoxy, or —NR$^1$R$^2$, wherein R$^1$ and R$^2$ are independently selected from the group consisting of hydrogen, lower-alkyl, phenyl, and benzyl, and together with the nitrogen atom may represent pyrrolidino, piperidino, morpholino, piperazino, N-alkylpiperazino, or mono or poly C-lower-alkyl derivatives thereof. The alkylene radical A may be substituted by X at any suitable position, the particular position being determinative of whether A in the compounds of Formula I is a straight or branched chain alkylene group.

According to one reaction procedure, the preformed phenolate, such as the sodium salt of a compound of Formula II, may be treated with the selected appropriately substituted halide X—A—COZ either in the presence or the absence of an added solvent at a suitable reaction temperature, e.g., usually about 20–150° centigrade, to yield the desired —O—A—COZ substituted product. Alternatively, a mixture of the phenol and the appropriately substituted halide may be treated with a suitable alkali such as sodium methoxide, sodium ethoxide, sodium or potassium or calcium hydroxide, sodium or potassium carbonate, sodium hydride or amide, preferably in the presence of a suitable reaction solvent such as ethanol or other lower alkanol, water or an inert solvent such as benzene, toluene, xylene, or the like, at an elevated temperature, preferably at or about the boiling point of the solvent or combination of solvents employed. The reaction usually requires a period of several minutes to several hours, depending upon the exact reactants and reaction conditions employed. This procedure produces a metal phenolate in situ, which then condenses during the remaining stage of the reaction with the second reactant X—A—COZ to produce the desired —O—A—COZ substituted product. In either procedure, the —COZ products in which Z is OM, M being an alkali or alkaline earth metal, may be hydrolyzed to the carboxy group with acid according to standard acidic hydrolysis procedure, or the water-soluble salts such as the potassium and sodium salts may be used as such. As a further procedural variation the acid or acid salt may be produced by standard saponification of a lower-alkyl ester —O—A—COZ wherein Z is lower-alkoxy, e.g., ethoxy as with aqueous alcoholic sodium or potassium hydroxide, using for example hot ethanol or amyl alcohol. The procedure gives the acid salt which may again be converted to the free acid by standard acid hydrolysis procedure, if desired.

When a starting material of Formula II is used, in which both Y and Y' are alkali metal phenolate groups, and a smaller amount of X—A—COZ is used than that required to react completely with both phenolate groups, either R' or R" of the final product of Formula I may be a hydroxy group. When an excess of the second reactant is employed, both phenolate groups are converted to the desired —O—A—COZ substituent.

The phenolic hydroxy-containing triarylacrylonitriles, most of which are new compounds, are prepared as follows:

*Preparation 1.—3,3-diphenyl-2-(4-hydroxphenyl)acrylonitrile*

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux is added a solution of 90 grams (0.61 mole) of 4-methoxyphenylacetonitrile in 200 milliliters of dry benzene over a one-hour period. The reaction mixture is refluxed four additional hours at the end of which time hydrogen evolution has practically ceased. The reaction mixture is kept at room temperture for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)-acrylonitrile is obtained as yellow needles melting at about 148–149° centigrade.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° centigrade.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3diphenyl2[4-(tetrahydropyran-2-yloxy)phenyl]-acrylonitrile which is prepared by the condensation of benzophenone with 4-(tetrahydropyran-2-yloxy)phenyl-acetonitrile (procedure of Preparation 3) to give 3,3-diphenyl-2-[4-tetrahydropyran-2-yloxy)phenyl] - acrylonitrile, melting at about 143–144° centigrade. The compound has uterotrophic and gonadotrophic inhibitory activity.

*Analysis.*—Calculated for $C_{26}H_{23}NO_2$: C, 81.86; H, 6.08; N, 3.67. Found: C, 81.60; H, 6.08; N, 3.69.

*Preparation 2.—2-(4-hydroxyphenyl)-3,3-bis(4-tolyl)-acrylonitrile*

By the procedure described in Preparation 1, 4,4'-dimethylbenzophenone is allowed to react with 4-methoxyphenylacetonitrile to give 2-(4-methoxyphenyl)-3,3-bis(4-tolyl)acrylonitrile, yellow crystals when crystallized from isopropanol, melting at about 146–148° centigrade.

*Analysis.*—Calculated for $C_{24}H_{21}NO$: C, 84.95; H, 6.23; N, 4.12. Found: C, 84.52; H, 6.76; N, 3.91.

By treating 2 - (4 - methoxyphenyl) - 3,3 - bis(4-tolyl)acrylonitrile with pyridine hydrochloride according to the procedure of Preparation 1, 2 - (4 - hydroxyphenyl) - 3,3 - bis(4 - tolyl)acrylonitrile is obtained as yellow crystals melting at about 229–230° centigrade.

*Analysis.*—Calculated for $C_{23}H_{19}NO$: C, 84.90; H, 5.88; N, 4.31. Found: C, 84.74; H, 5.69; N, 4.70.

*Preparation 3.—2-(4-hydroxyphenyl)-3,3-bis(4-methoxyphenyl)-acrylonitrile*

A mixture of 160 grams (1.2 moles) of 4 - hydroxyphenyl - acetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy)phenylacetonitrile, yellow crystals melting at about 64–66° centigrade.

To a refluxing suspension of 70 grams (1.8 moles) of sodium amide and 150 milliliters of benzene is added a solution of 154 grams (0.72 mole) of 4 - (tetrahydropyran - 2 - yloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4'-dimethoxy-benzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° centigrade) from which a yellow solid, melting at about 202–206° centigrade, is obtained by evaporation. This solid is dissolved in 500 milliliters of boiling glacial acetic acid containing three drops of concentrated sulfuric acid and slowly diluted with water until yellow needles separate (about 800 milliliters of water is needed). 2 - (4 - hydroxyphenyl) - 3,3 - bis(4 - methoxyphenyl)acrylonitrile is obtained as yellow crystals melting at about 217–219° centigrade.

*Analysis.*—Calculated for $C_{23}H_{19}NO_3$: C, 77.29; H, 5.36; N, 3.92. Found: C, 77.38; H, 5.34; N, 3.81.

*Preparation 4.—3,3-bis(4-chlorophenyl)-2-(4-hydroxyphenyl)-acrylonitrile*

By the procedure described in Preparation 3, 4,4' - dichlorobenzophenone is allowed to react with 4 - (tetrahydropyran - 2 - yloxy)phenylacetonitrile to give 3,3 - bis (4 - chlorophenyl) - 2 - (4 - hydroxyphenyl)acrylonitrile, yellow crystals when crystallized from acetic acid, melting at about 252–254° centigrade.

*Analysis.*—Calculated for $C_{21}H_{13}Cl_2NO$: C, 68.88; H, 3.58; N, 3.82. Found: C, 68.80; H, 3.58; N, 3.85.

*Preparation 5.—2,3-diphenyl-3-(4-hydroxyphenyl) acrylonitrile*

A mixture of 100 grams (0.505 mole) of 4-hydroxybenzophenone and 50 grams (0.595 mole) of dihydropyran is dissolved in 500 milliliters of warm dry benzene and two milliliters of concentrated hydrochloric acid is added. The reaction mixture is refluxed for four hours and then kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure to give a yellow oil, which is dissolved in pentane to give white crystals of 4 - (tetrahydropyran - 2 - yloxy)benzophenone, melting at about 49–51° centigrade.

*Analysis.*—Calculated for $C_{18}H_{18}O_3$: C, 76.60; H, 6.43. Found: C, 76.65; H, 6.44.

To a refluxing suspension of eight grams (0.205 mole) of sodium amide in 200 milliliters of diethyl ether is added a solution of 11.4 grams (0.1 mole) of phenylacetonitrile in 200 milliliters of diethyl ether over a two-hour period. The reaction mixture is refluxed for one additional hour, at the end of which time ammonia evolution has practically ceased. With stirring, a solution of 28 grams (0.1 mole) of 4 - (tetrahydropyran - 2 - yloxy) benzophenone in 100 milliliters of diethyl ether is added. After two additional hours reflux, the reaction mixture is kept at room temperature for sixteen hours and excess sodium amide cautiously decomposed with water. The organic layer is washed several times with water, dried over anhydrous magnesium sulfate, filtered, and the solvent removed under reduced pressure. The residual oil is dissolved in methanol from which white crystals of 2,3 - diphenyl - 3, - [4 - (tetrahydropyran - 2 - yloxy) phenyl]acrylonitrile separate, melting over a range from 118 to 144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 82.15; H, 6.25; N, 3.87.

These crystals are dissolved in 100 milliliters of boiling glacial acetic acid containing three drops of concentrated sulfuric acid and slowly diluted with water until yellow needles separate (about 250 milliliters of water is needed). 2,3 - diphenyl - 3 - (4 - hydroxyphenyl)acrylonitrile is obtained as yellowish crystals melting at about 207–208° centigrade.

*Preparation 6.—3-(4-hydroxyphenyl)-2-(4-methoxyphenyl)-3-phenylacrylonitrile*

By the procedure described in Preparation 5, 4 - (tetrahydropyran - 2 - yloxy)benzophenone is allowed to react with 4-methoxyphenylacetonitrile to give 3-(4-hydroxyphenyl) - 2 - (4 - methoxyphenyl) - 3 - phenylacrylonitrile, yellowish crystals when crystallized from acetic acid, melting at about 189–191° centigrade.

*Analysis.*—Calculated for $C_{22}H_{17}NO_2$: C, 80.73; H, 5.24; N, 4.28. Found: C, 80.10; H, 5.32; N, 4.46.

*Preparation 7.—2-(4-chlorophenyl)-3-(4-hydroxyphenly)-3-phenylacrylonitrile*

By the procedure described in Preparation 5, 4-(tetrahydropyran-2-yloxy)benzophenone is allowed to react with 4-chlorophenylacetonitrile. The ether is removed and the reaction mixture is extracted with hexane from which a crop of crystals separate. These are recrystallized from ethanol to give one of the geometric forms of 2-(4-chlorophenyl)-3-phenyl - 3 - [4 - (tetrahydropyran-2-yloxy) phenyl]acrylonitrile, melting at about 183-184° centigrade.

*Analysis.*—Calculated for $C_{26}H_{22}ClNO_2$: C, 75.10; H, 5.33; N, 3.37. Found: C, 75.00; H, 5.42; N, 3.43.

The oily residue from the above hexane mother liquor and the crystals of tetrahydropyranyl derivative are treated separately in glacial acetic acid to give the two geometric forms of 2-(4-chlorophenyl)-3-(4-hydroxyphenyl)-3-phenyl-acrylonitrile, melting at about 175–177° and 187–789° centigrade, respectively.

*Analysis.*—Calculated for $C_{21}H_{14}ClNO$: C, 76.03; H, 4.25; N, 4.22. Found, respectively: C, 76.18; H, 4.29; N, 4.11; C, 76.07; H, 4.62; N, 4.12.

*Preparation 8.—3,3-bis(4-dimethylaminophenyl)-2-(4-hydroxyphenyl)acrylonitrile*

By the procedure described in Preparation 3, 4,4'-bis-(dimethylamino)benzophenone is allowed to react with 4 - (tetrahydropyran-2-yloxy)phenylacetonitrile to give 3,3-bis(4 - dimethylaminophenyl)-2-[4-(tetrahydropyran-2-yloxy)phenyl]acrylonitrile, yellow crystals when crystallized from dimethylformamide-ethanol (1:20), melting at about 189–191° centigrade.

*Analysis.*—Calculated for $C_{30}H_{33}N_3O_2$: C, 77.05; H, 7.11; N, 8.99. Found: C, 76.82; H, 7.23; N, 8.88.

The tetrahydropyranyl derivative dissolved in dimethylformamide is decomposed with excess 30 percent sulfuric acid and, upon neutralization with diethylamine, orange crystals of 3,3-bis(4 - dimethylaminophenyl)-2-(4 - hydroxyphenyl)acrylonitrile are obtained, melting at about 240–242° centigrade.

*Analysis.*—Calculated for $C_{25}H_{25}N_3O$: C, 78.29; H, 6.57; N, 10.95. Found: C, 77.80; H, 6.76; N, 10.78.

*Preparation 9.—2,3-bis(4-hydroxyphenyl)-3-phenylacrylonitrile*

By the procedure described in Preparation 5, 4-(tetrahydropyran-2-yloxy)benzephenone is allowed to react with 4-(tetrahydropyran-2-yloxy)phenyl acetonitrile. The ether is removed and the reaction mixture is dissolved in ethanol, from which a crop of crystals separate. These are recrystallized from dimethylformamide to give one of the geometric forms of 3-phenyl-2,3-bis[4-tetrahydropyran-2-yloxy)phenyl]-acrylonitrile, melting at about 189–191° centigrade.

*Analysis.*—Calculated for $C_{31}H_{31}NO_4$: C, 77.31; H, 6.49; N, 2.91. Found: C, 76.75; H, 6.68; N, 3.28.

The oily residue from the above ethanol mother liquor and the crystals of the tetrahydropyranyl derivative are treated separately in glacial acetic acid to give the two geometric forms of 2,3-bis(4-hydroxyphenyl)-3-phenyl-acrylonitrile, melting at about 263–264° and 261–262° centigrade, respectively.

*Analysis.*—Calculated for $C_{21}H_{15}NO_2$: C, 80.51; H, 4.83; N, 4.47. Found, respectively: C, 80.20; H, 4.96; N, 4.31; C, 80.56; H, 4.98; N, 4.22.

*Preparation 10.—2,3-diphenyl-3-(2-hydroxyphenyl) acrylonitrile*

Using 2-hydroxybenzophenone in place of 4-hydroxybenzophenone in the procedure of Preparation 5, 2,3-diphenyl-3-(2-hydroxyphenyl)acrylonitrile is obtained as yellow crystals.

*Preparation 11.—2-(4-hydroxyphenyl)-3,3-bis(4-trifluoromethylphenyl)acrylonitrile*

By the procedure described in Preparation 1, 4,4'-bis (trifluoromethyl)benzophenone is allowed to react with 4-methoxyphenylacetonitrile to give 2-(4-methoxyphenyl)-3,3-bis(4-trifluoromethylphenyl) acrylonitrile.

By treating 2-(4-methoxyphenyl)-3,3-bis(4 - trifluoromethylphenyl)acrylonitrile with pyridine hydrochloride according to the procedure of Preparation 1, 2-(4-hydroxyphenyl)-3,3-bis(4 - trifluoromethyl)acrylonitrile is obtained.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes are readily made.

An alternative method for the preparation of the compounds of the invention comprises the condensation of a benzophenone with a phenylacetonitrile in which one or the other of the reactants is substituted on a phenyl ring with —O—A—COZ as defined above.

The following examples are given by way of illustration only and are not to be construed as limiting.

EXAMPLE 1

[4-(1-cyano-2,2-diphenylvinyl)phenoxy]-acetic acid.—Twenty-two grams (0.075 mole) of 3,3-diphenyl-2-(4-hydroxyphenyl)acrylonitrile and four grams (0.074 mole) of sodium methoxide in 200 milliliters of butyl alcohol are stirred and brought to reflux. A suspension of 8.6 grams (0.074 mole) of sodium chloroacetate in 20 milliliters of butyl alcohol is added over a thirty-minute period and refluxing continued for three additional hours. The solvent is removed under reduced pressure and the residue taken up in 400 milliliters of water and acidified with 40 milliliters of ten percent hydrochloric acid. The precipitated product is filtered and dissolved in 200 milliliters of hot glacial acetic acid and diluted with 50 milliliters of hot water. [4-(1-cyano-2,2-diphenylvinyl)phenoxy]acetic acid is obtained as fine, yellow crystals, melting at about 149–150° centigrade. The compound has gonadotrophic inhibitory, uterotrophic and myotrophic activities.

Analysis.—Calculated for $C_{23}H_{17}NO_3$: C, 77.73; H, 4.82; N, 3.94. Found: C, 77.45; H, 4.48; N, 3.93.

EXAMPLE 2

Ethyl 4-(1-cyano-2,2-diphenylvinyl)phenoxyacetate.—Twenty-one grams (0.071 mole) of 3,3-diphenyl-2-(4-hydroxyphenyl)acrylonitrile and 3.8 grams (0.071 mole) of sodium methoxide are stirred in 200 milliliters of ethanol and heated to reflux. Twelve grams (0.072 mole) of ethyl bromoacetate is added over a thirty-minute period and refluxing continued for two hours. The hot reaction mixture is filtered and, on cooling, 19 grams of crude material obtained and repeatedly crystallized from ethanol to give the desired product, ethyl 4-(1-cyano-2,2-diphenylvinyl)phenoxyacetate, as fine, yellow crystals, melting at about 109–110° centigrade. The compound has gonadotrophic inhibitory, uterotrophic and myotrophic activities.

Analysis.—Calculated for $C_{25}H_{21}NO_3$: C, 78.30; H, 5.52; N, 3.65. Found: C, 78.08; H, 5.49; N, 3.73.

EXAMPLE 3

4-(1-cyano-2,2-diphenylvinyl)phenoxyacetamide.—By the procedure described in Example 2, 3,3-diphenyl-2-(4-hydroxyphenyl)acrylonitrile is allowed to react with chloroacetamide in place of ethyl bromoacetate, to give 4-(1-cyano-2,2-diphenylvinyl)phenoxyacetamide as greenish-yellow crystals melting at about 175–176° centigrade. The compound has uterotrophic activity.

Analysis.—Calculated for $C_{23}H_{18}N_2O_2$: C, 77.95; H, 5.12; N, 7.90. Found: C, 78.00; H, 5.27; N, 7.88.

EXAMPLE 4

{4 - [1-cyano - 2,2-bis(4 - tolyl)vinyl]phenoxy}-acetic acid.—By the procedure described in Example 1, 2-(4-hydroxyphenyl)-3,3-bis(4-tolyl)acrylonitrile is allowed to react with sodium chloroacetate to give {4-[1-cyano-2,2-bis(4-tolyl)vinyl]phenoxy}acetic acid as yellow crystals melting at about 164–165° centigrade. The compound has uterotrophic activity.

Analysis.—Calculated for $C_{25}H_{21}NO_3$: C, 78.31; H, 5.53; N, 3.65. Found: C, 78.58; H, 5.66; N, 3.78.

EXAMPLE 5

Ethyl {4-[1-cyano-2,2-bis(4 - tolyl)vinyl]phenoxy}-acetate.—By the procedure described in Example 2, 2-(4-hydroxyphenyl)-3,3-bis(4-tolyl)acrylonitrile is allowed to react with ethyl bromoacetate to give ethyl {4-[1-cyano-2,2-bis(4-tolyl)vinyl]phenoxy}acetate as yellow crystals melting at about 94–95° centigrade. The compound has uterotrophic activity.

Analysis.—Calculated for $C_{27}H_{25}NO_3$: C, 78.81; H, 6.13; N, 3.40. Found: C, 78.74; H, 6.20; N, 3.26.

EXAMPLE 6

Ethyl 4-[2,2 - bis(4-chlorophenyl) - 1-cyanovinyl]phenoxyacetate.—By the procedure described in Example 2, 3,3-bis(4-chlorophenyl) - 2 - (4-hydroxyphenyl)acrylonitrile is allowed to react with ethyl bromoacetate to give ethyl 4-[2,2-bis(4-chlorophenyl) - 1-cyanovinyl]phenoxyacetate as greenish-yellow crystals melting at about 113–115° centigrade. The compound has uterotrophic activity.

Analysis.—Calculated for $C_{25}H_{19}Cl_2NO_3$: C, 66.38; H, 4.23; N, 3.10. Found: C, 65.98; H, 4.48; N, 2.95.

EXAMPLE 7

Ethyl 2-{4-[2,2-bis(4-chlorophenyl)-1-cyanovinyl]phenoxy}butyrate.—By the procedure described in Example 2, 3,3-bis(4-chlorophenyl)-2-(4-hydroxyphenyl)acrylonitrile is allowed to react with ethyl 2-bromobutyrate to give ethyl 2-{4-[2,2-bis(4-chlorophenyl) - 1-cyanovinyl]phenoxy}butyrate as yellowish crystals melting at about 117–118° centigrade. The compound has uterotrophic activity.

Analysis.—Calculated for $C_{27}H_{23}Cl_2NO_3$: C, 67.51; H, 4.83; N, 2.92. Found: C, 67.20; H, 4.76; N, 2.99.

EXAMPLE 8

Ethyl 4-[1-cyano-2,2-bis(4-methoxyphenyl)-vinyl]phenoxyacetate.—By the procedure described in Example 2, 2-(4-hydroxyphenyl) - 3,3-bis(4-methoxyphenyl)acrylonitrile is allowed to react with ethyl bromoacetate to give ethyl 4-[1-cyano-2,2-bis(4-methoxyphenyl)vinyl]phenoxyacetate as yellow crystals melting at about 125–127° centigrade. The compound has uterotrophic activity.

Analysis.—Calculated for $C_{27}H_{25}NO_5$: C, 73.12; H, 5.68; N, 3.16. Found: C, 72.95; H, 5.73; N, 3.24.

EXAMPLE 9

Ethyl 2 - {4-[1-cyano-2,2-bis(4-methoxyphenyl)-vinyl]phenoxy}butyrate.—By the procedure described in Examate to give ethyl 2-{4-[1-cyano-2,2-bis(4-methoxyphenyl)acrylonitrile is allowed to react with ethyl 2-bromobutyrate to give ethyl 2-{4-[1-cyano-2,2-bis(methoxyphenyl)vinyl]phenoxy}butyrate as white crystals melting at about 119–121° centigrade. The compound has uterotrophic activity.

*Analysis.*—Calculated for $C_{29}H_{29}NO_5$: C, 73.87; H, 6.20; N, 2.97. Found: C, 73.74; H, 6.28; N, 3.35.

EXAMPLE 10

*4-[1-cyano-2,2-bis(4 - methoxyphenyl)vinyl]-phenoxyacetamide.*—By the procedure described in Example 2, 2-(4-hydroxyphenyl)-3,3-bis(4 - methoxyphenyl)acrylonitrile is allowed to react with chloroacetamide in place of ethyl bromoacetate, to give 4-[1-cyano-2,2-bis(4-methoxyphenyl)vinyl]phenoxyacetamide as yellow crystals melting at about 163–165° centigrade. The compound has uterotrophic activity.

*Analysis.*—Calculated for $C_{25}H_{22}N_2O_4$: C, 72.45; H, 5.35; N, 6.76. Found: C, 72.44; H, 5.62; N, 6.77.

EXAMPLE 11

*Ethyl 4 - (2-cyano-1,2-diphenylvinyl)phenoxyacetate.*—By the procedure described in Example 2, 2,3-diphenyl-3-(4-hydroxyphenyl)acrylonitrile is allowed to react with ethyl bromoacetate to give ethyl 4-(2-cyano-1,2-diphenylvinyl)phenoxyacetate, as pale yellow crystals melting at about 121–124° centigrade. The compound has uterotrophic and gonadotrophic inhibitory activities.

*Analysis.*—Calculated for $C_{25}H_{21}NO_3$: C, 78.30; H, 5.52; N, 3.65. Found: C, 78.40; H, 5.77; N, 3.52.

EXAMPLE 12

*4-(2-cyano - 1,2 - diphenylvinyl)phenoxyacetic acid.*—To a solution of ten grams (0.026 mole) of ethyl 4-(2-cyano-1,2-diphenylvinyl)phenoxyacetate in 100 milliliters of hot ethanol is added forty milliliters of ten percent sodium hydroxide over a period of fifteen minutes. The mixture is kept on the steam bath for another thirty minutes, diluted with sixty milliliters of water and the ethanol removed at reduced pressure. The aqueous mixture is acidified with ten percent hydrochloric acid, the precipitate collected, dissolved in a minimum of hot (100°) glacial acetic acid, and diluted with hot water until cloudy. Crystalline 4-(2-cyano-1,2 - diphenylvinyl)phenoxyacetic acid is obtained, melting at about 190–193° centigrade. The compound has uterotrophic and gonadotrophic inhibitory activities.

*Analysis.*—Calculated for $C_{23}H_{17}NO_3$: C, 77.73; H, 4.82; N, 3.94. Found: C, 77.32; H, 5.33; N, 4.32.

EXAMPLE 13

*Ethyl 4-[2 - cyano-2-(4-methoxyphenyl)-1-phenylvinyl]phenoxyacetate.*—By the procedure described in Example 2, 3-(4-hydroxyphenyl)-2-(4 - methoxyphenyl)-3-phenylacrylonitrile is allowed to react with ethyl bromoacetate to give ethyl 4-[2-cyano-2-(4-methoxyphenyl)-1-phenylvinyl]phenoxyacetate, as pale yellow crystals melting at about 112–114° centigrade. The compound has uterotrophic and gonadotrophic inhibitory activities.

*Analysis.*—Calculated for $C_{26}H_{23}NO_4$: C, 75.53; H, 5.61; N, 3.40. Found: C, 75.68; H, 5.42; N, 3.68.

EXAMPLE 14

*4-[2 - cyano-2-(4 - methoxyphenyl)-1-phenylvinyl]phenoxyacetic acid.*—By the procedure described in Example 12, ethyl 4-[2-cyano-2-(4-methoxyphenyl)-1-phenylvinyl]phenoxyacetate is allowed to react with sodium hydroxide to give 4-[2 - cyano-2-(4-methoxyphenyl)-1-phenylvinyl]phenoxyacetic acid as yellowish crystals melting at about 202–204° centigrade. The compound has uterotrophic activity.

*Analysis.*—Calculated for $C_{24}H_{19}NO_4$: C, 74.80; H, 4.97; N, 3.63. Found: C, 74.42; H, 5.32; N, 3.76.

EXAMPLE 15

*4-[2 - (4 - chlorophenyl) - 2-cyano-1-phenylvinyl]phenoxy acid.*—By the procedure described in Example 1, 2-(4 - chlorophenyl)-3-(4-hydroxyphenyl)-3-phenylacrylonitrile is allowed to react with sodium chloroacetate to give 4-[2-(4 - chlorophenyl)-2-cyano-1-phenylvinyl]phenoxyacetic acid.

EXAMPLE 16

*4-[4 - (1 - cyano-2,2-diphenylvinyl)phenoxy] - butyric acid.*—By the procedure described in Example 1, 3,3-diphenyl-2-(4-hydroxyphenyl)acrylonitrile is allowed to react with sodium 4-chlorobutyrate to give 4-[4-(1-cyano-2,2-diphenylvinyl)phenoxy]butyric acid.

EXAMPLE 17

*Ethyl{4-[1-cyano-2,2-bis(4 - dimethylaminophenyl)vinyl]phenoxy}acetate.*—By the procedure described in Example 2, 3,3 - bis(4 - dimethylaminophenyl) - 2-(4-hydroxyphenyl)acrylonitrile is allowed to react with ethyl bromoacetate to give ethyl{4-[1-cyano-2,2-bis(4-dimethylaminophenyl)vinyl]phenoxy}acetate.

EXAMPLE 18

*2,3 - bis(4 - carboxymethoxyphenyl)-3-phenylacrylonitrile.*—By the procedure described in Example 1, fifteen parts of 2,3-bis(4-hydroxyphenyl)-3-phenylacrylonitrile is first treated with five parts of sodium methoxide, followed by eleven parts of sodium chloroacetate, to give 2,3-bis(4-carboxymethoxyphenyl)-3-phenylacrylonitrile.

EXAMPLE 19

*[2-(2-cyano-1,2 - diphenylvinyl)phenoxy]acetic acid.*—By the procedure described in Example 1, 2,3-diphenyl-3-(2-hydroxyphenyl)acrylonitrile is allowed to react with sodium chloroacetate to give [2-(2-cyano-1,2-diphenylvinyl)phenoxy]acetic acid.

EXAMPLE 20

*{4-[1 - cyano - 2,2-bis(4 - trifluoromethylphenyl)vinyl]phenoxy}acetic acid.*—By the procedure described in Example 1, 2-(4-hydroxyphenyl)-3,3-bis(4-trifluoromethyl)acrylonitrile is allowed to react with sodium chloroacetate to give {4-[1-cyano-2,2-bis(4-trifluoromethylphenyl)vinyl]phenoxy}acetic acid.

Although in this example both R and R′, as designated in Formula I above, are trifluoromethyl, compounds wherein only one, or any other combination of two of R, R′ and R″ are trifluoromethyl, are produced from the corresponding hydroxy-containing starting material.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl and octyl are prepared in the same manner by substitution in the process of the appropriate different lower-alkyl starting material. Lower-alkylene groups in the compounds thus produced may be varied in the same manner, and may be, for example, ethylene, propylene, butylene, isobutylene, or the like. Likewise, where chloro or other halogen atom is present although chlorine is preferred, further halogen compounds including iodo, bromo, chloro, and fluoro compounds are prepared starting from the appropriate halogenated starting material. Similarly, where methoxy or other lower-alkoxy group is present, other compounds having lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets, or tablets, with or without but preferably with any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired. Broader ranges appear to be one to 500 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such as a suitable effective dosage will be obtained constant with the dosage form employed. Obviously, several unit dosage forms may be administered at about the same time. The exact individual dosage as well as daily dosages in a particular case will of course be determined according to well-established principles.

It is to be understood that the invention is not to be limited to the exact details of operation or exact compounds, compositions, or procedures shown and decribed, as obvious modifications and equivalents will be apparent to one skilled in the art, and the invention is therefore to be limited only by the scope of the appended claims.

We claim:
1. A triarylacrylonitrile having the formula:

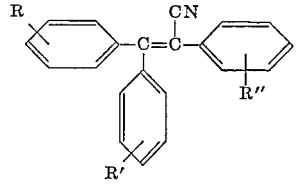

wherein R is selected from the group consisting of hydrogen, lower-alkyl, lower-alkoxy, halogen, trifluoromethyl, and dilower-alkylamino, and wherein R' and R" are independently selected from the group consisting of hydrogen, lower-alkyl, lower-alkoxy, halogen, trifluoromethyl, dilower-alkylamino, hydroxy, and —O—A—COZ, in which A is lower-alkylene and Z is selected from the group consisting of hydroxy, OM wherein M is selected from the group consisting of alkali and alkaline earth metals, lower-alkoxy, and —NR$^1$R$^2$ in which R$^1$ and R$^2$ are independently selected from the group consisting of hydrogen, lower-alkyl, phenyl, and benzyl and, together with the N, pyrrolidino, piperidino, morpholino, piperazino, N-lower-alkylpiperazino, and C-lower-alkyl derivatives thereof, at least one of R' and R" being —O—A—COZ.

2. (1-cyano-2,2-diphenylvinyl)phenoxy lower-alkanoic acid.
3. Alkali metal salt of a compound of claim 2.
4. (2-cyano-1,2-diphenylvinyl)phenoxy lower-alkanoic acid.
5. Alkali metal salt of a compound of claim 4.
6. Lower-alkyl (1-cyano-2,2-diphenylvinyl)phenoxy lower-alkanoate.
7. Lower-alkyl (2-cyano-1,2-diphenylvinyl)phenoxy lower-alkanoate.
8. Primary amide of (1-cyano-2,2-diphenylvinyl)phenoxy lower-alkanoic acid.
9. Primary amide of (2-cyano-1,2-diphenylvinyl)phenoxy lower-alkanoic acid.
10. [4-(1-cyano-2,2-diphenylvinyl)phenoxy]acetic acid.
11. Ethyl 4-(1-cyano-2,2-diphenylvinyl)phenoxyacetate.
12. 4-(1-cyano-2,2-diphenylvinyl)phenoxyacetamide.
13. Ethyl 4-[2,2-bis(4-chlorophenyl)-1-cyanovinyl]-phenoxyacetate.
14. Ethyl 4-(2-cyano-1,2-diphenylvinyl)phenoxyacetate.
15. [4-(2-cyano-1,2-diphenylvinyl)phenoxy]acetic acid.
16. Lower-alkyl 4-[2,2-bis(4-chlorophenyl)-1-cyanovinyl]phenoxyacetate.

References Cited
UNITED STATES PATENTS
3,255,242   6/1966   Bolhofer _____ 260—520

CHARLES B. PARKER, *Primary Examiner.*

DOLPH H. TORRENCE, *Assistant Examiner.*

UNITED STATES PATENT OFFICE
CERTIFICATE OF CORRECTION

Patent No. 3,336,356                                          August 15, 1967

Robert Edward Allen et al.

It is hereby certified that error appears in the above numbered patent requiring correction and that the said Letters Patent should read as corrected below.

Column 3, line 74, for "3,3diphenyl2[4-" read -- 3,3-diphenyl-2-[4- --; column 5, lines 66 and 67, for "(4-hydroxyphenly)", in italics, read -- (4-hydroxyphenyl) --, in italics; column 6, line 10, for "187-789°" read -- 187-189° --; lines 43 and 44, for "[4-tetrahydropyran" read -- [4-(tetrahydropyran --; column 8, lines 72 and 73, strike out "Examate to give ethyl 2-{4-[1-cyano-2,2-bis(4-methoxyphenyl)" and insert instead -- Example 2,2-(4-hydroxyphenyl)-3,3-bis(4-methoxyphenyl) --; line 74, for "bis(methoxyphenyl)" read -- bis(4-methoxyphenyl) --; column 9, line 33, for "nf ten" read -- of ten --; column 9, line 75, for "noxy acid" read -- noxyacetic acid --; column 11, line 52, for "such as a suitable" read -- such that a suitable --; line 53, for "obtained constant with" read -- obtained consistent with --.

Signed and sealed this 3rd day of September 1968.

(SEAL)
Attest:

EDWARD M. FLETCHER, JR.                         EDWARD J. BRENNER
Attesting Officer                                   Commissioner of Patents